UNITED STATES PATENT OFFICE.

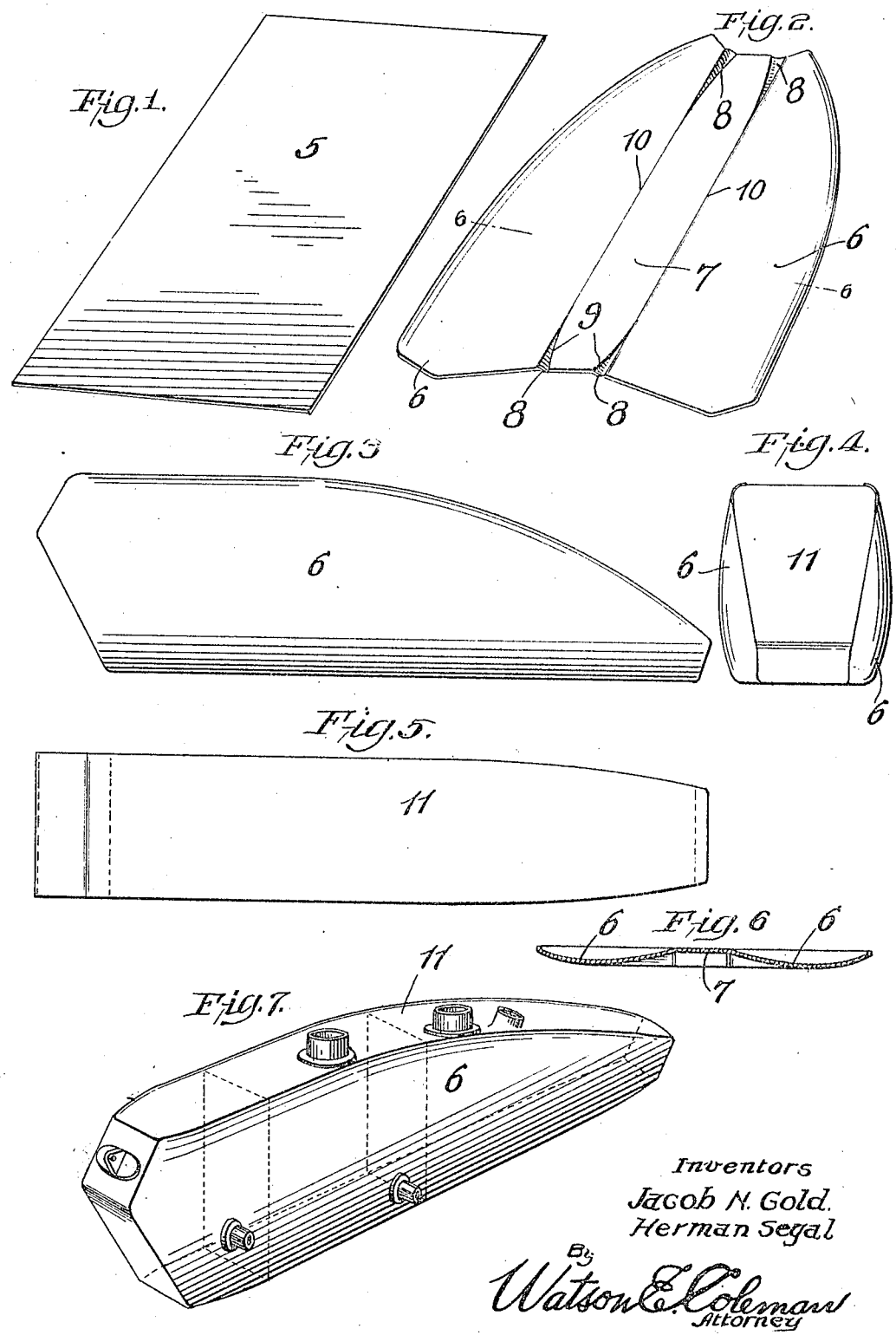

JACOB N. GOLD AND HERMAN SEGAL, OF PHILADELPHIA, PENNSYLVANIA.

MOTOR-CYCLE FUEL-TANK.

1,207,020.  Specification of Letters Patent.  Patented Dec. 5, 1916.

Application filed September 27, 1916. Serial No. 122,466.

*To all whom it may concern:*

Be it known that we, JACOB N. GOLD and HERMAN SEGAL, (the said GOLD a citizen of the United States and the said SEGAL a subject of the Czar of Russia,) residing at Philadelphia, in the county of Philadelphia and State of Pennsylvania, have invented certain new and useful Improvements in Motor-Cycle Fuel-Tanks, of which the following is a specification, reference being had to the accompanying drawings.

This invention relates to improvements in motorcycle fuel tanks and has for its primary object to provide a tank or reservoir of this character which is so constructed as to eliminate the necessity of soldering a large number of seams or joints, whereby the manufacturing cost may be reduced to a minimum and the structural strength of the tank greatly increased.

It is an additional object of our invention to provide a motorcycle fuel tank wherein the elongated body consisting of the side and bottom walls is formed or stamped out of a single metal sheet and the top and end walls formed from a second sheet of metal soldered or otherwise secured by means of a fluid-tight joint to the edges of the body sheet.

It is a further general object of the invention to provide an improved construction of motorcycle fuel tanks whereby the process of manufacture is greatly expedited, and the manual labor incident thereto reduced to a minimum.

With the above and other objects in view, our invention consists in the novel features of construction, combination and arrangement of parts to be hereinafter more fully described, claimed and illustrated in the accompanying drawing, in which, Figure 1 is a perspective view of the blank metal sheet from which the body of the tank or reservoir is formed; Fig. 2 is a similar view of said metal sheet after it has been trimmed and properly stamped or pressed; Fig. 3 is a side elevation of the tank body; Fig. 4 is an end elevation; Fig. 5 is a plan view of the top of the tank; Fig. 6 is a section taken on the line 6—6 of Fig. 2; and Fig. 7 is a perspective view of the completed tank.

Referring in detail to the drawing, 5 designates the rectangular blank sheet of metal from which the body of the tank is to be formed. This metal blank is stamped and trimmed into the form shown in Fig. 2 to produce the slightly concavo-convex, longitudinal side walls 6 which gradually decrease in width or taper from one of their ends to the other. The relatively narrow, intermediate section 7 of the stamp and blank constitutes the bottom wall of the tank, and at the opposite ends of said intermediate section at its juncture with each of the side walls 6, the metal sheet is depressed, as at 8, so as to produce the inwardly curved edges 9 at the extremities of the intermediate section 7 of the metal blank. The ends of the side walls 6 are trimmed or cut along proper lines so that when said walls are bent upwardly along the parallel, longitudinal lines 10, the outline or contour of the tank will be that seen in Fig. 3 of the drawing.

The top and ends of the fuel tank are formed from a separate metal sheet 11, said sheet slightly tapering at one of its ends so as to properly fit between the tapered ends of the side walls 6. The end portions of the metal sheet 11 are suitably bent to conform to the end edges of said side walls, and said metal sheet is then fitted into place between the longitudinal and end edges of the side walls 6. The two pieces of metal are then secured together along their meeting edges by solder to provide a fluid-tight joint.

After the parts of the sheet metal tank have been assembled and secured together as above stated, the necessary fittings are applied as shown in Fig. 7, whereby the tank may be mounted in the motorcycle frame and the pipes or conduits connected thereto. While we have shown in the accompanying drawing a particular shape or form of the tank, it is, of course, manifest that the tank may also be constructed in various other shapes and in different sizes, the essential feature of the invention residing in the construction of the tank from only two pieces of sheet metal, thereby reducing the number of joints or seams to be soldered and minimizing the possibility of leakage. It will also be appreciated that a tank constructed in this manner will be exceedingly strong and durable and capable of withstanding the rather severe usage to which motorcycle fuel tanks are subjected. Our invention also greatly reduces the cost of manufacturing such articles as well as the labor incident thereto.

While we have shown and described the preferred construction and arrangement of the several features of our improved fuel tank, it is, nevertheless, to be understood that the device is susceptible of considerable modification and we, therefore, reserve the privilege or adopting all such legitimate changes as may be fairly embodied within the spirit and scope of the invention as claimed.

Having thus fu'ly described our invention, what we desire to claim and secure by Letters Patent is:—

The herein described method of manufacturing motorcycle fuel tanks which consists in stamping and bending a sheet metal blank to form the side and bottom walls of the tank, then stamping and bending a second sheet metal blank to form the top and end walls of the tank, and finally fitting said top and end walls between the edges of the side walls and soldering said top and end walls along their edges to the side and bottom walls of the first named blank.

In testimony whereof we hereunto affix our signatures in the presence of two witnesses.

JACOB N. GOLD.
HERMAN SEGAL.

Witnesses:
JAMES S. CLIFFORD,
W. LEIGH DURHAM.

Copies of this patent may be obtained for five cents each, by addressing the "Commissioner of Patents, Washington, D. C."